United States Patent
Gardiner et al.

[11] Patent Number: 6,091,547
[45] Date of Patent: *Jul. 18, 2000

[54] LUMINANCE CONTROL FILM

[75] Inventors: Mark Edward Gardiner, Santa Rosa, Calif.; Mark Brian O'Neill, New Brighton; David Lee Wortman, St. Paul, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/846,955

[22] Filed: Apr. 30, 1997

Related U.S. Application Data

[63] Continuation of application No. 08/312,720, Sep. 27, 1994, abandoned.

[51] Int. Cl.[7] ................................................. G02B 27/10
[52] U.S. Cl. ............................................ 359/625; 359/621
[58] Field of Search ................................. 359/625, 619, 359/640, 569, 574, 621, 622, 628; 40/442; 345/139; 385/129

[56] References Cited

U.S. PATENT DOCUMENTS

| | | | |
|---|---|---|---|
| 2,124,139 | 7/1938 | Eggert | 359/640 |
| 3,349,238 | 10/1967 | Kruger | 240/9.5 |
| 4,542,449 | 9/1985 | Whitehead | 362/330 |
| 4,615,579 | 10/1986 | Whitehead | 350/96.1 |
| 4,729,640 | 3/1988 | Sakata | 359/529 |
| 4,791,540 | 12/1988 | Dreyer, Jr. et al. | 362/331 |
| 4,805,984 | 2/1989 | Cobb, Jr. | 350/96.28 |
| 5,035,486 | 7/1991 | Inokuchi | 359/619 |
| 5,054,885 | 10/1991 | Melby | 359/618 |
| 5,056,892 | 10/1991 | Cobb, Jr. | 359/831 |
| 5,126,882 | 6/1992 | Oe | 359/619 |
| 5,161,041 | 11/1992 | Abileah et al. | 359/40 |
| 5,262,880 | 11/1993 | Abileah | 359/40 |
| 5,280,371 | 1/1994 | McCartney, Jr. et al. | 359/40 |
| 5,333,072 | 7/1994 | Willett | 359/41 |
| 5,363,240 | 11/1994 | Miyashita | 359/625 |
| 5,422,683 | 6/1995 | Tanigaki | 348/744 |
| 5,442,523 | 8/1995 | Kashima et al. | 362/31 |
| 5,448,649 | 9/1995 | Chen | 382/126 |
| 5,471,344 | 11/1995 | Sugawara | 359/566 |
| 5,591,527 | 1/1997 | Lu | 428/411.1 |

FOREIGN PATENT DOCUMENTS

| | | | |
|---|---|---|---|
| 0 504 910 A3 | 9/1992 | European Pat. Off. | F21V 7/00 |
| 0 531 939 A1 | 9/1992 | European Pat. Off. | |
| 0 597 261 A1 | 10/1993 | European Pat. Off. | |
| 0 588 504 A1 | 3/1994 | European Pat. Off. | G02F 1/1335 |
| 2 551 179 | 3/1985 | France | F21V 5/02 |
| 6-95108 | 10/1991 | Japan | |
| 4034309901 | 11/1992 | Japan | 359/569 |
| 4318534 | 11/1992 | Japan | |
| 6018873 | 1/1994 | Japan | |
| 6148620 | 5/1994 | Japan | 359/625 |
| 6222207 | 8/1994 | Japan | 359/619 |
| 93/00550 | 1/1993 | WIPO | 359/619 |

OTHER PUBLICATIONS

"Polarized Backlight For Liquid Crystal Display", IBM Technical Disclosure Bulletin, vol. 33, No. 1B, Jun., 1990.

*Primary Examiner*—Ricky Mack
*Attorney, Agent, or Firm*—Stephen W. Buckingham

[57] ABSTRACT

The luminance control film includes a periodic array of optical structures which are small with respect to the wavelength of light. Scattering and diffractive effects result in improved off-axis illumination intensity in comparison with brightness enhancement optical devices having larger scale optical structures.

6 Claims, 9 Drawing Sheets

LUMINANCE CONTROL FILM

This is a continuation of application Ser. No. 08/312,720 filed Sep. 27, 1994 abandoned.

FIELD OF THE INVENTION

The present invention relates generally to an optical film for inclusion in an optical display assembly. More particularly the invention relates to a structured optical film used in combination with a light source to control the luminance and viewing angle of an optical display assembly.

BACKGROUND OF THE INVENTION

The typical optical display assembly contains a light source that is required to observe the information presented by the display. In battery powered equipment like laptop computers, the light source can represent a substantial fraction of the total power draw of the equipment. Therefore, reducing the amount of power required to produce a given luminance, increases battery life which is especially desirable in battery powered equipment.

The 3M brand Brightness Enhancement Film available from the 3M Company of Maplewood, Minn., USA, is used to address this problem. This material is a film that includes a periodic array of prisms. The prisms are large in comparison with the wavelength of light. This material collects light from "off-axis" and redirects or "recycles" this light "on-axis" toward the viewer. In use, this material increases the on-axis luminance at the expense of off-axis luminance. In this fashion, the material can help the display designer achieve the desired amount of on-axis luminance with reduced power consumption.

However, with this product there is a sharp decline in luminance as one views the optical display assembly off-axis. The sharp reduction in luminance for an off-axis observer has proved to be undesirable in some applications.

Another problem associated with the use of periodic films in optical display assemblies is the generation of moiré patterns that are visible to the viewer and are distracting and undesirable.

SUMMARY

The luminance control film of the present invention addresses the problems discussed above. The film is made as a sheet that includes a linear array of prisms that are very small. The periodicity or "pitch" covers a size range extending from about one micrometer to approximately thirty micrometers. These dimensions are on the order of two to sixty times the wavelength of light.

A single sheet of this luminance control film may be placed over a light source to improve on-axis luminance while producing a "softer" luminance drop off as the viewer moves off the central viewing axis. Two pieces of the luminance control film can be stacked together producing a luminance control film assembly. In the luminance control film assembly the prism axes are "crossed" and the assembly is placed over a light source.

In either configuration the prisms interact with the light emanating from the light source to control the luminance of the display by diffractive scattering and by "recycling" light. The diffractive scattering reduces the slope of the curve of the luminance as a function of viewing angle. This process results in the "softer" fall off of light compared to other "gain" producing films of similar geometry but larger facet size.

The diffractive scattering and small prisms also reduce moiré patterns. Moiré reduction results from the smaller physical structures which increases the spatial frequency of any resultant pattern. The small size of the prisms increases the relative displacement of the prism facets which also increases the spatial frequency of the pattern. Diffractive scattering also reduces the contrast of the moiré which makes it less visible.

BRIEF DESCRIPTION OF THE DRAWINGS

An exemplary and illustrative luminance control film 10 and related control film assembly 32 are shown in the accompanying drawings. Throughout the figures identical reference numerals identify equivalent structure, wherein.

DETAILED DESCRIPTION

Figure 1:
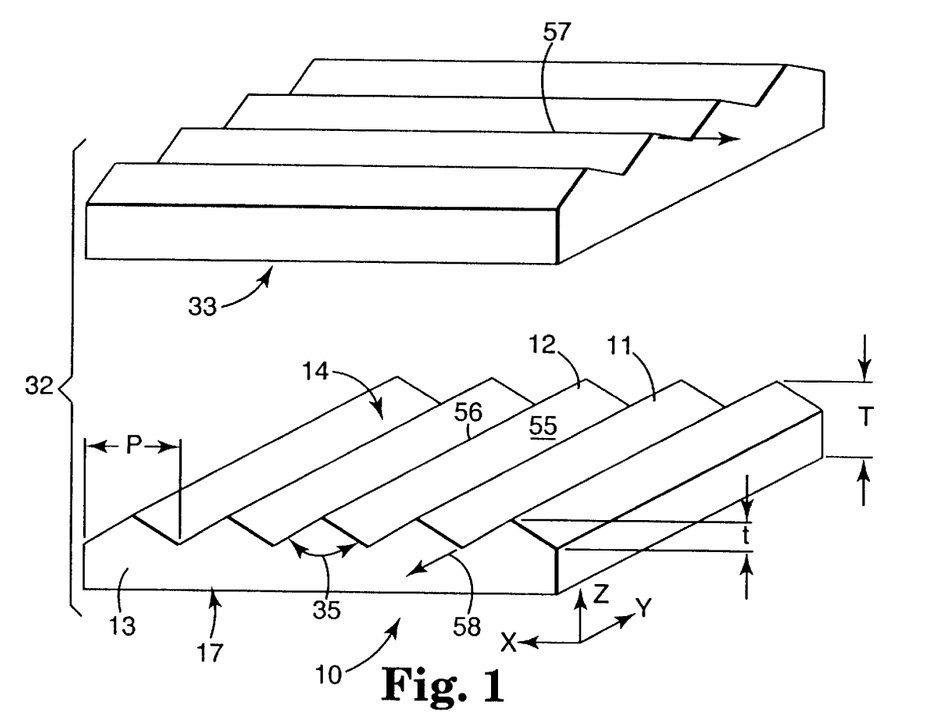
FIG. 1 shows a segment of the luminance control film 10 and the luminance control film assembly 32.

FIG. 1 shows an exemplary luminance control assembly 32 formed from a first luminance control film 10 stacked with a second luminance control film 33. The scale of the drawing is exaggerated to more clearly show the structure of the film and the assembly. The drawing includes a coordinate system 19 that is useful for discussing the geometry of the luminance control film 10 and the film assembly 32. The luminance control film 10 preferably includes an array of regular right prisms typified by prism 12 and prism 11. Prism 12 and the adjacent prism 11 define a pitch "P". Each prism 12 has a first facet 55 and a second facet 56. An exemplary faceted structure should have a pitch spacing between 1.0 micrometers and 30.0 micrometers, with a preferred range of 2.0 micrometers to 20.0 micrometers, and a most preferred range between 2.0 micrometers and 10.0 micrometers. The prisms are formed on a body portion 13 that has a first surface 14 and a second surface 17. The prisms will be formed on either the first surface 14 or the second surface 17 but not both. Thus one surface of the body portion 13 will be non-faceted and substantially flat or planar and the other surface of the body portion 13 will have a prismatic structure.

It should be appreciated that a suitable faceted structure can be manufactured using any of a variety of techniques including various photographic and mechanical techniques. Although other periodic structures are contemplated within the scope of the invention, a linear array of regular right prisms is preferred for both optical performance and ease of manufacture. Although the various exemplary performance curves are taken from samples of film of this form, various modification may be made. For example the apex angle 35 of the prisms may depart from ninety degrees (70 to 120 degrees), the prism facets need not be isosceles or identical, and the prisms may be tilted with respect to each other. In practice, the preferred luminance control film 10 will be formed as a sheet approximately 0.005 inches (0.127 mm) thick. This sheet must be made from a material that is transparent at the wavelengths of interest. In general, optical displays operate at the visible wavelengths (0.4 micrometers>lambda>0.7 micrometers) and thermoplastic polymers such as polycarbonate may be used to form the film. The choice of material and pitch should be selected based upon the operating wavelength for the system and will generally satisfy the expression; (60>P/lambda>2 for lambda=0.5 micrometers). The relationship between the thickness of the film "T" and the height of the prisms "t" is not critical but it is desirable to use thinner substrates with well defined prism facets. Consequently the typical ratio of prism height to total thickness will generally satisfy the expression; (20/125>t/T>2/125).

Figure 6:
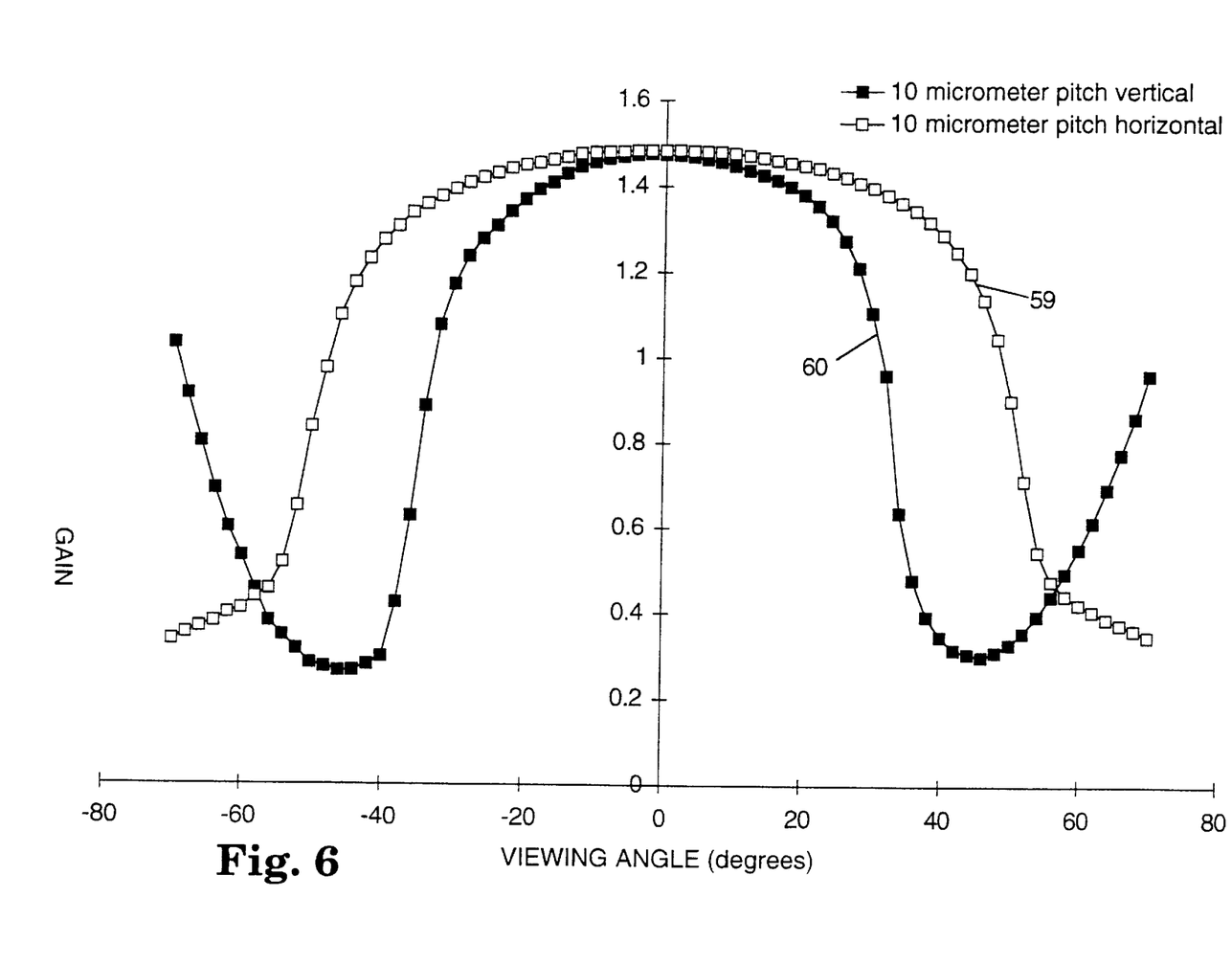
FIG. 6 is a plot comparing the vertical scan data with horizontal scan data.

It should be recognized that the optical performance of the linear array of prisms is not symmetric. The luminance measured for luminance control film 10 in the XZ plane is called a horizontal scan. The luminance measured for luminance control film 10 taken in the YZ plane is referred to a vertical scan. The vertical and horizontal scans differ as depicted in FIG. 6.

The luminance control film assembly 32 in FIG. 1 shows two films "crossed" to sum the optical effects of individual sheets. Luminance control film 10 has a prism axis 58 parallel to the prism apexes, and luminance control film 33 has a prism axis 57 parallel to the prism apexes of that film. These two axes may be projected onto the XY plane to define the crossing angle theta for the luminance control film assembly 32.

Figure 2:
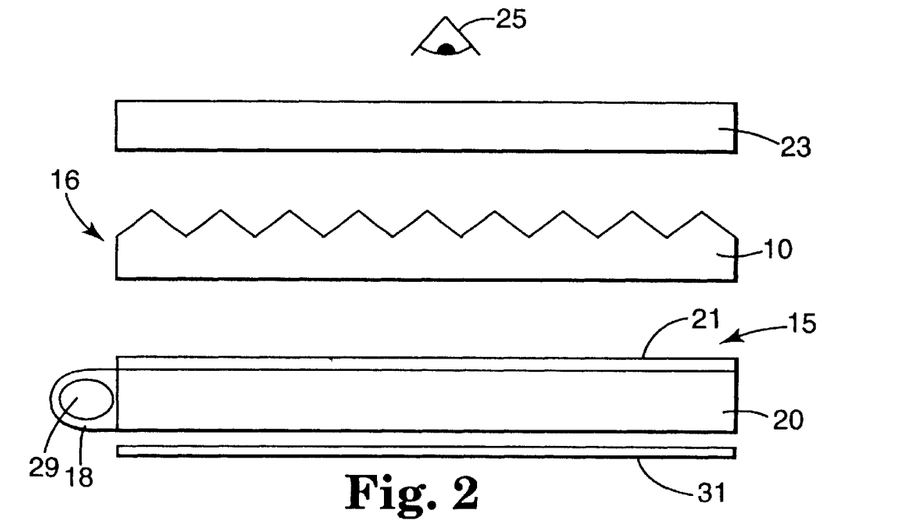
FIG. 2 is a cross section of an optical display assembly 16 incorporating a luminance control film 10.

FIG. 2 depicts an optical display assembly 16 that is an assembly of a back light as an light source 15, a display panel 23, and a luminance control film 10. The light source 15 is shown as a back light. The back light includes a lamp 18. This lamp 18 is surrounded by a lamp reflector 29 that is coupled to a light guide 20. Light contained within the light guide 20 is totally internally reflected by the surfaces of the light guide until it impinges upon a reflective extraction spot. In practice, the light guide 20 has a number of such extraction spots patterned along the lower surface of the light guide 20. These extraction spots operate to distribute light to the display panel 23 in a uniform fashion. Light extracted from the light guide 20 impinges on a diffuser 21 that performs two functions. The diffuser 21 obscures the light guide extraction spot pattern from the viewer 25. The diffuser 21 also generates a more even illumination of the display panel 23.

The light from the light source 15 is incident on the non-faceted or planar second surface 17 of the luminance control film 10. A large portion of this incident light is directed toward the display panel 23. This light is ultimately directed to the viewer 25 who is located directly in front of the display assembly 16. Some fraction of the light incident on the luminance control film 10 is returned to the diffuser 21. The light returned to the diffuser 21 from the luminance control film 10 is transmitted through, or reflected from diffuser 21. The light transmitted to the light guide 20 is reflected back by reflector 31. This light is ultimately redirected and is able to emerge from the display assembly 16. This process is called "recycling" and this process must be efficient for the luminance control film to generate gain.

The optimal light source 15 for any given application will depend on the specific requirements of the application and no specific parameters can be described. However it is important to note that the reflectivity of the light source 15 is an important design parameter since light returned to the light source 15 and absorbed or attenuated does not reach the viewer 25 and therefore does not contribute to the illumination of the display. Although a back light is shown in FIG. 2 it should be understood that other light sources may be used without departing from the scope of the invention. For example FIG. 3 depicts an optical display assembly 16 that is an assembly of an electroluminescent panel 22 as the light source 15.

Figure 3:
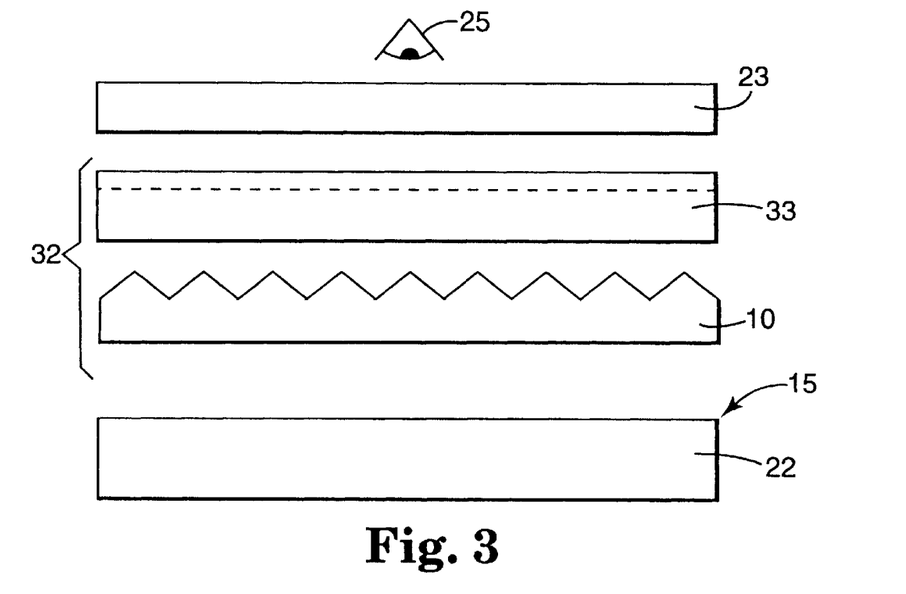
FIG. 3 is a cross section of an optical display assembly 16 incorporating a luminance control film assembly 32.

FIG. 3 also shows a display panel 23, and a luminance control film assembly 32. The control film assembly 32 shown in the figure is made up from two "crossed" films. The sheets are stacked with the prisms facing away from the light source 15 and with the prism axis of one sheet orthogonal to the prism axis of the other sheet. With multiple crossed films the periodicity or apex angles of individual layers can be varied between the two sheets to achieve various effects. The crossing angle theta can be varied as well.

A typical example of a suitable display panel 23 for use in either the FIG. 2 or FIG. 3 optical display assembly 16 is the ubiquitous liquid crystal display (LCD) found in digital watches, lap top computers, and other instruments. The display panel 23 receives light from the luminance control film assembly 32 or luminance control film 10. It is important to know that the typical display technologies used for display panels which are now available include arrays or repetitive patterns of transistors and/or electrode elements for displaying information. The patterning of the display panel 23 in combination with other patterned optical devices within the display assembly 16 can result in moiré patterns that are visible and distracting to the viewer 25. Moiré patterns can be caused by several processes. A transparent periodic structure will modulate the light that passes through it. If this modulated light is reflected back to the viewer the light can "beat" against it's reflection and give rise to a pattern. This process is dependant upon the viewing angle as well, with patterns being visible in some directions and not visible at other viewing angles. In general, moiré is difficult to control and the classic method of reducing moiré is to physically separate the pattern producing structures. However this solution increases the thickness and complexity of the display assembly and is unacceptable.

The luminance control film 10 substantially reduces moiré by the combined effect of increasing the spatial frequency of the moiré pattern to a value which the viewer 25 cannot resolve, and by reducing the contrast so that the moiré pattern modulation is below the viewers threshold of perception. These results are obtained with single sheets of luminance control film and with multiple sheets in "crossed" configurations.

Figure 4:
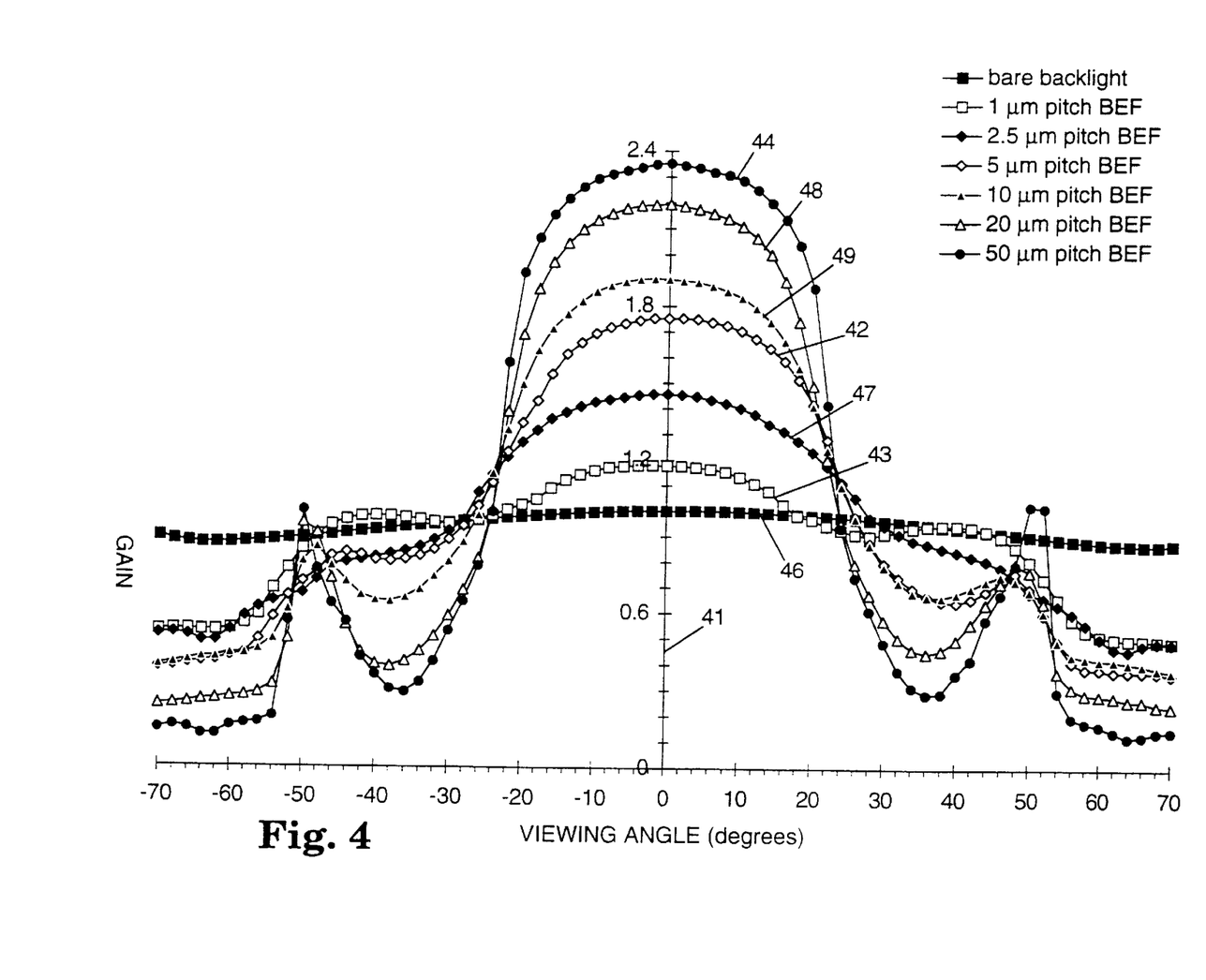
FIG. 4 is a vertical scan of luminance as a function of viewing angle for several samples of the luminance control film assembly 32.

FIG. 4 compares the optical performance of an orthogonally crossed luminance control film assembly 32 with variations in periodicity or pitch. Curve 44 represents the large scale fifty micrometer film while curve 46 represents the luminance curve for the back light alone. Intermediate curves show other pitches. Curve 48 is taken from twenty micrometer pitch film. Curve 49 is taken from ten micrometer pitch film. Curve 42 is taken from five micrometer pitch film. Curve 47 represents the luminance of a two and a half micrometer pitch film while curve 43 represents a one micrometer pitch film. The curve 46 defines the unity value on the intensity axis 41 normalized to the maximum luminance of the back light alone. As seen in the figure the luminance of the back light alone has a very low slope. The prior art device represented by curve 44 is substantially brighter on-axis than the back light alone. However it appears that in many applications a steep drop off of light as the viewer moves off-axis causes the displayed information to suddenly disappear even though there is some light is directed to the viewer at that angle. This effect is disconcerting to the viewer. By decreasing the contrast ratio (ratio of maximum to minimum luminance) the luminance control film 10 and luminance control film assembly 32 produces a more acceptable display while still maintaining an appreciable on-axis gain. This effect can be appreciated by comparing the light distribution of curve 42 with the light distribution of curve 44.

Figure 5:
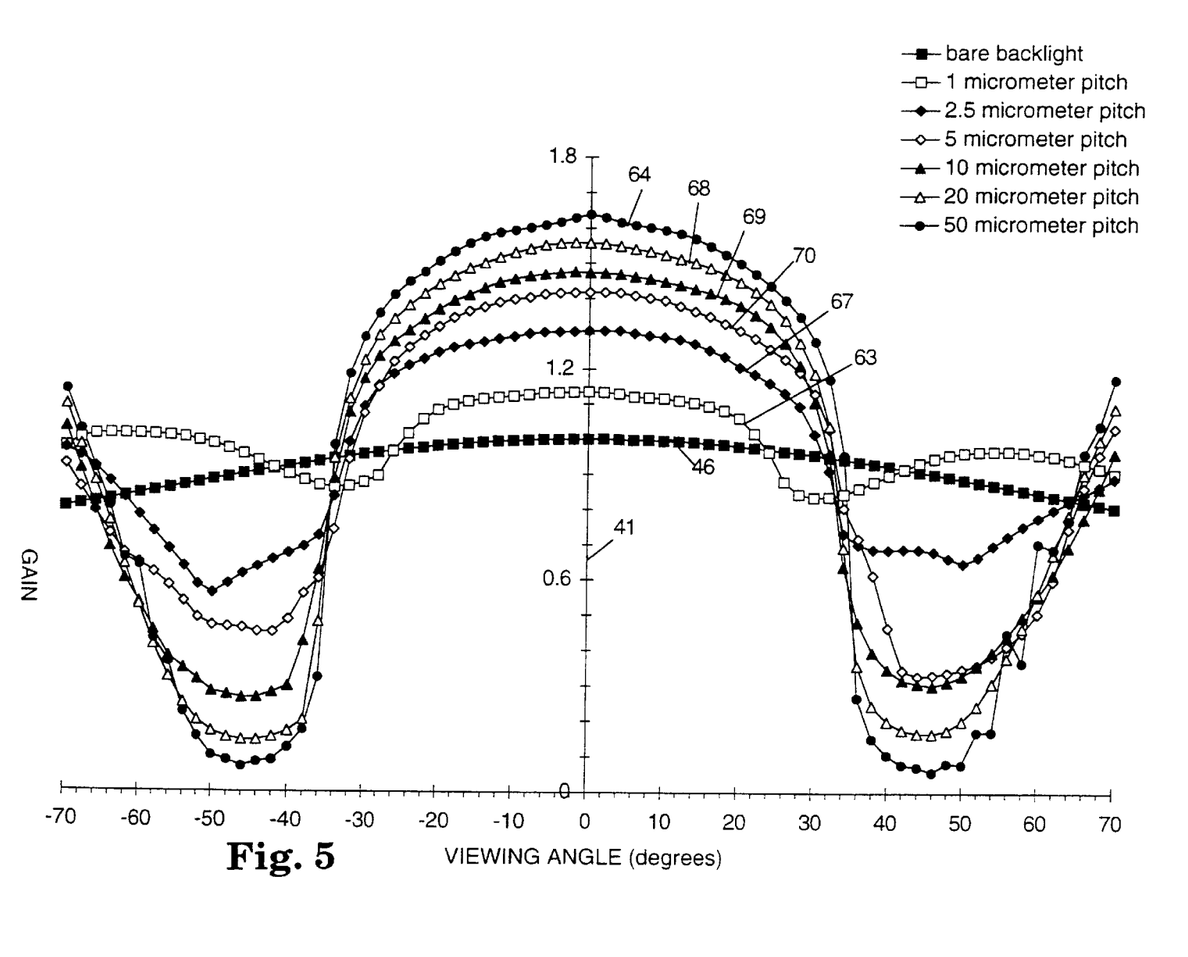
FIG. 5 is a vertical scan of luminance as a function of viewing angle for several samples of the luminance control film 10.

FIG. 5 shows a vertical scan of the on-axis gain as a function of the viewing angle for single piece of luminance control film 10. This figure may be compared to the performance of the assembly 32 shown in FIG. 4 to contrast the characteristics of single and multiple sheets. In this figure curve 64 represents a single sheet of prior art material with a 50 micrometer pitch, and the curve 46 represents the luminance of the backlight alone. Curve 68 represents a measurement of 20 micrometer film. Curve 69 represents data form a 10 micrometer material. Curve 70 represents 5 micrometer pitch material. Curve 67 represents 2.5 micrometer material and curve 63 represents 1 micrometer film.

FIG. 6 compares the "horizontal" and "vertical" performance of a single sheet of luminance control film having a 10 micrometer pitch. Curve 59 corresponds to a horizontal scan while curve 60 shows a vertical scan. The two scans show the lack of optical symmetry for the luminance control film 10 along these two directions.

Figure 7:
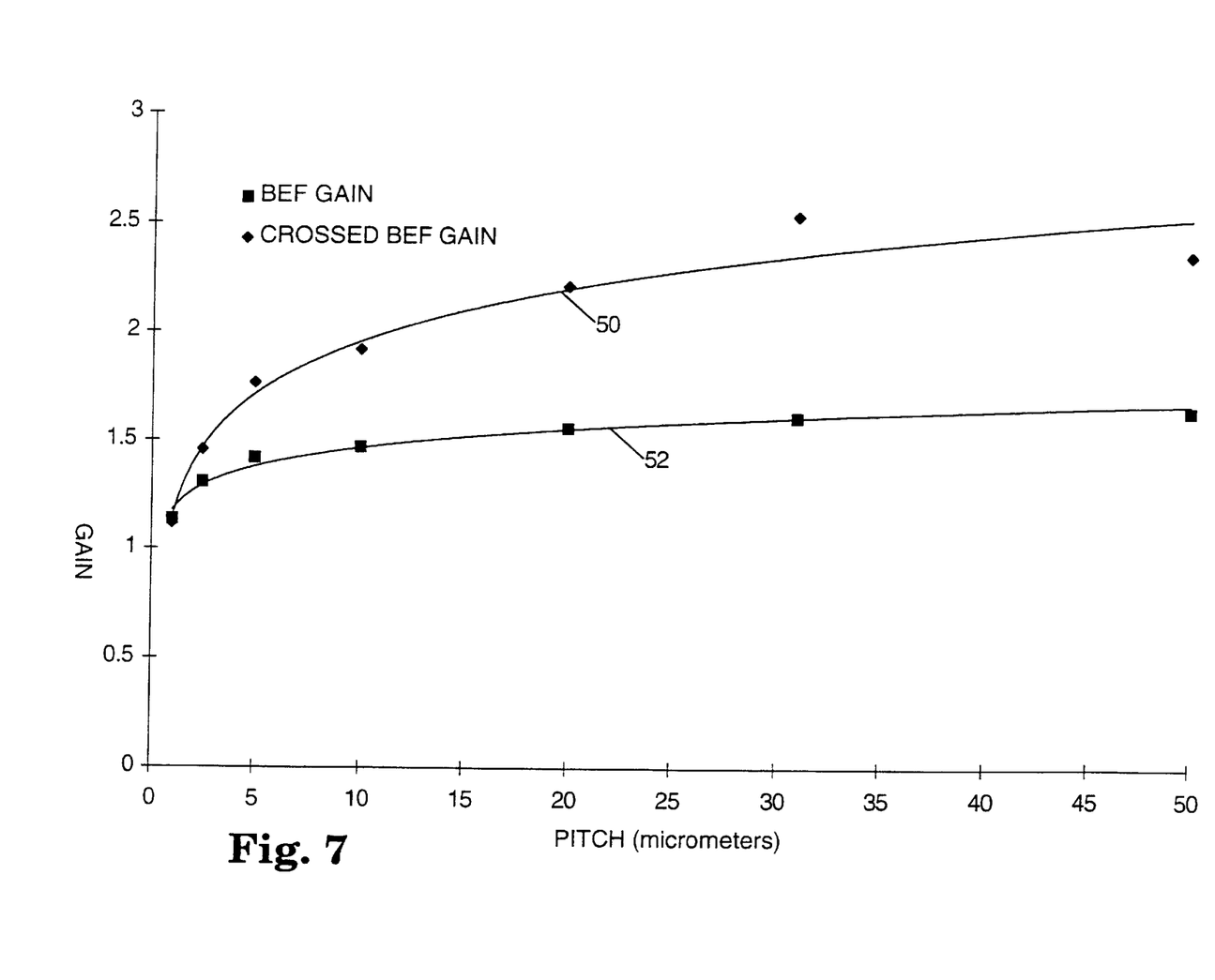
FIG. 7 is a plot comparing the gain of the luminance control film 10 and the luminance control film assembly 32 as a function of pitch.

FIG. 7 compares the gain of a luminance control assembly 32 and the gain of a luminance control film 10 as a function of pitch. In the range below 20 micrometers pitch the maximum gain value begins to decline. It is in this range that the favorable relationship between on-axis gain, off-axis luminance and moiré reduction occurs. In this range and nearer the lower portion of this range the contrast ratio produced will produce an optical display assembly with minimum moiré and with a pleasing viewing range. In FIG. 7 the curve 50 represents gain for the control film assembly 32 where theta equals ninety degrees, while curve 52 represents the gain for a single sheet of the luminance control film 10.

Figure 8:
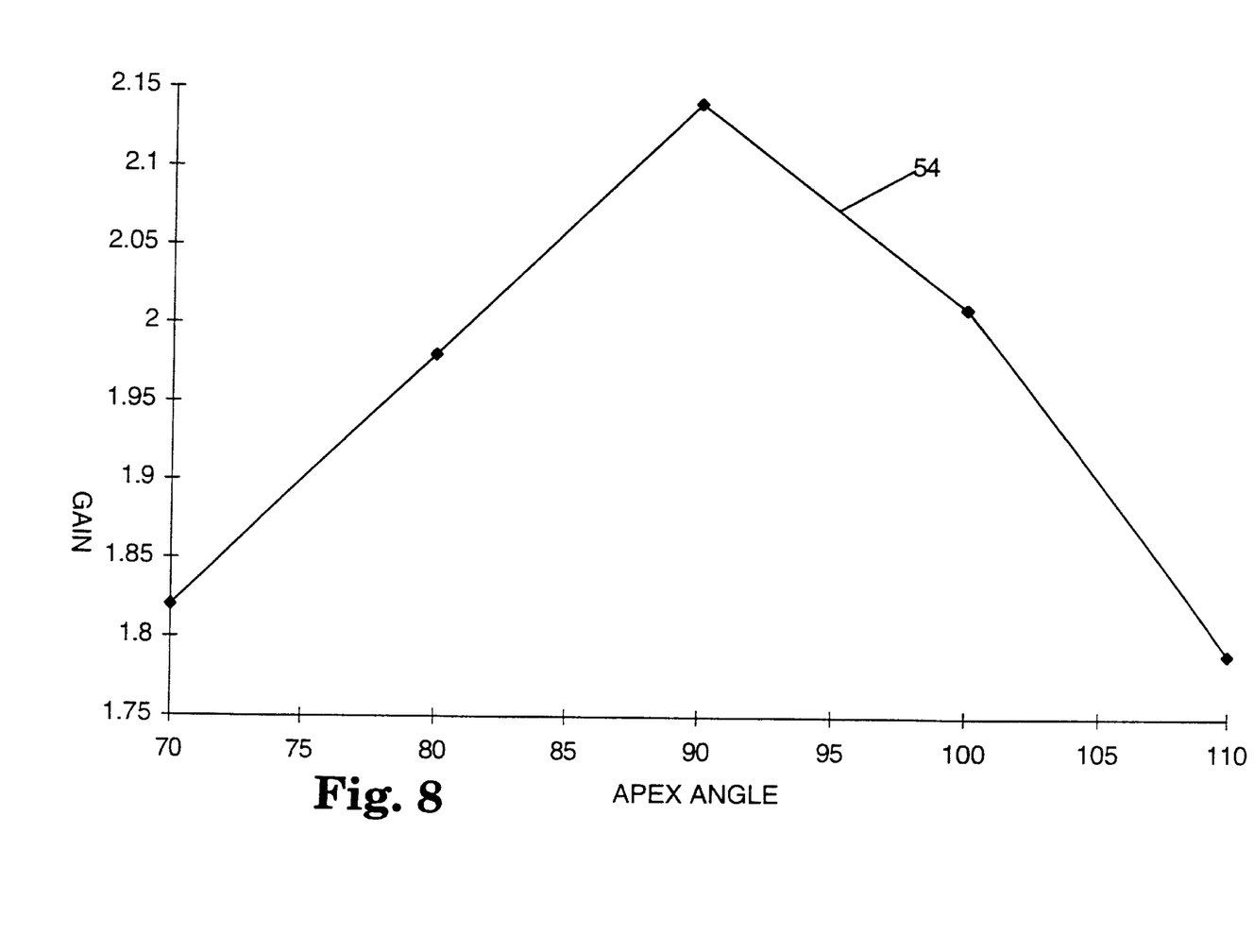
FIG. 8 is a computed graph depicting gain as a function of apex angle for the luminance control film 10.

FIG. 8 shows the calculated relationship between the apex angle of regular prisms and the maximum gain which is produced for a perfect back light. The curve 54 shows that maximum gain occurs at an apex angle of ninety degrees. Although angles less than and greater than ninety degrees are operable it is desirable to select an apex angle near ninety degrees and then adjust the pitch to achieve the desired on-axis gain and contrast attributes.

Figure 9:
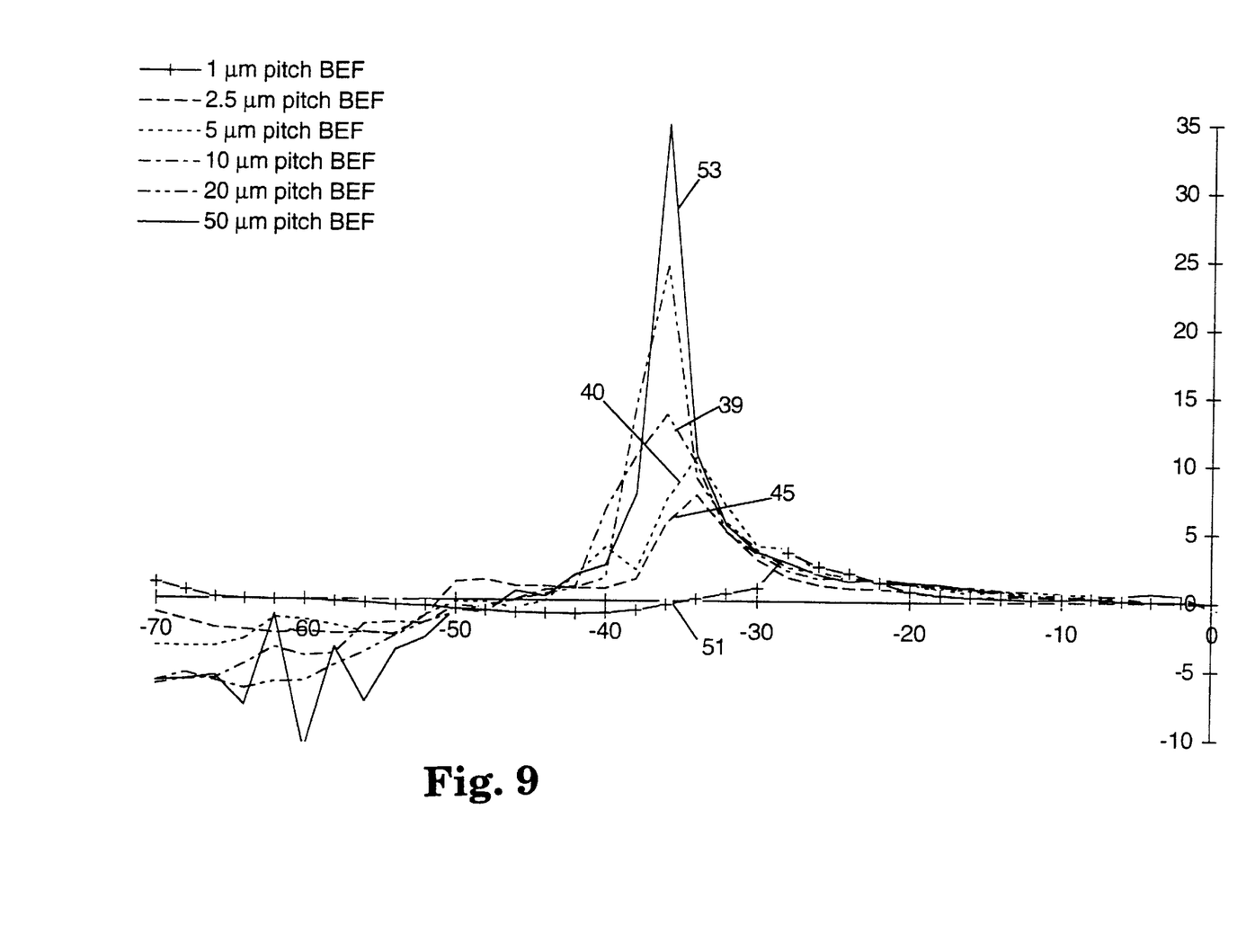
FIG. 9 is a plot of the slope of luminance as a function of viewing angle for various luminance control films 10: and, FIG. 10 is a plot of half power angle as a function of pitch.

FIG. 9 shows the data of FIG. 5 plotted to more clearly display the desirable alteration of the luminance slope at smaller pitches. Curve 39 corresponds to 10 micrometer pitch while curve 40 and curve 45 correspond to 5 micrometer and 2.5 micrometer pitch respectively. Curve 51 for a 1 micrometer pitch material shows an anomalous shape while curve 53 shows a prior material. It appears that the most desirable and pleasing displays result from the use of luminance control films 10 with a pitch from approximately 2 to 10 micrometers.

Figure 10:
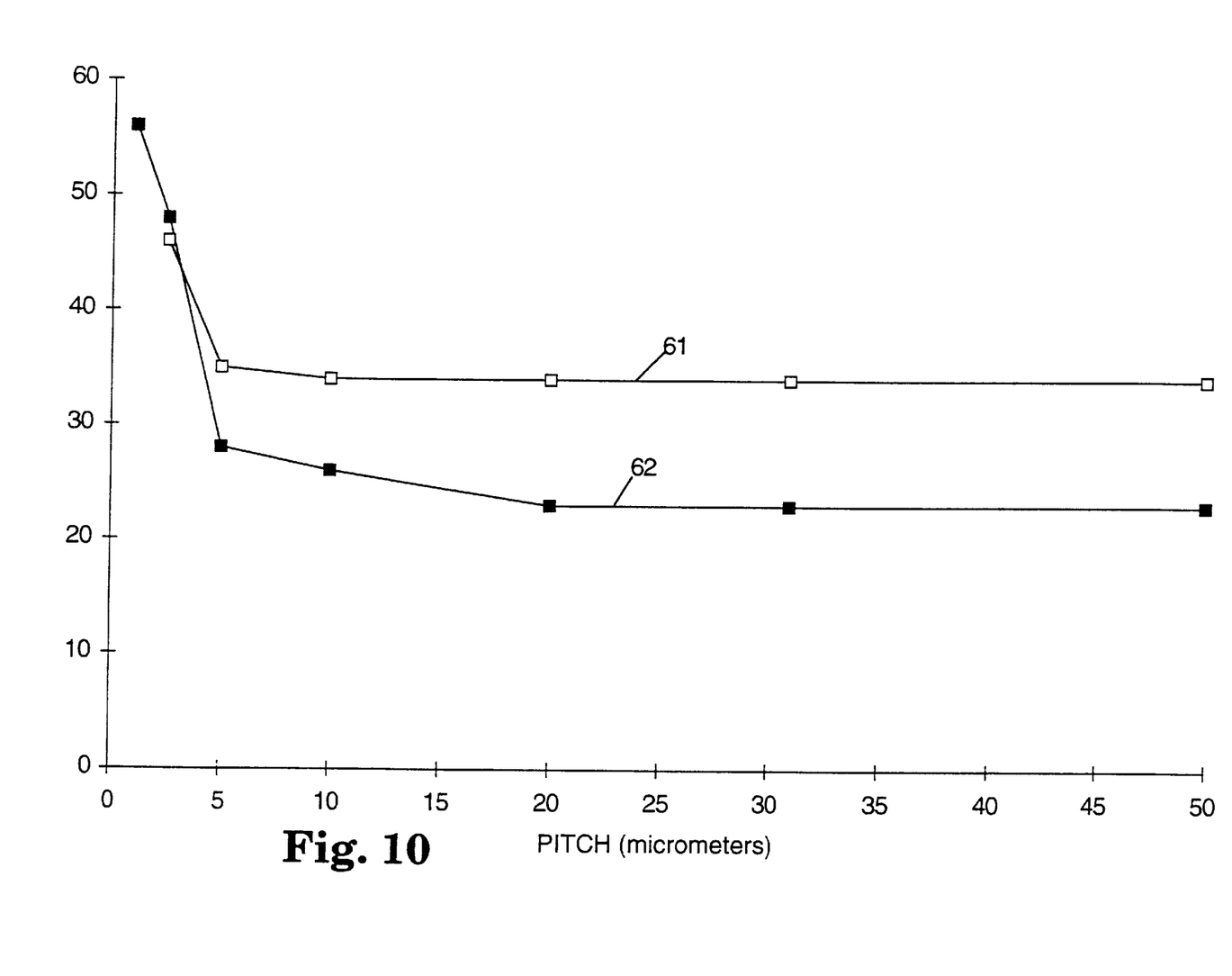

FIG. 10 shows the viewing angle at which the maximum luminance drops to one half the maximum value. Curve 61 is taken for a series of single luminance control films of varying pitches and curve 62 is taken from a set of crossed films. Both curves show a substantial increase in viewing angle for pitches below about 5 micrometers.

Although illustrative and exemplary films have been described, various modifications and changes may be made to the invention without departing from the scope of the invention.

What is claimed is:

1. A luminance control film assembly comprising:

a first luminance control film, and a second luminance control film;

said first luminance control film having a first prism axis;

said second luminance control film having a second prism axis;

wherein, said first prism axis and said second prism axis are not parallel, thereby forming a crossing angle theta;

each of said first and said second luminance control films having a body portion having a first surface and a second surface;

each of said first surfaces having a linear array of prisms characterized by pitch less than 30 micrometers whereby diffractive effects will cause a soft luminance dropoff as a viewer moves off a central viewing axis;

each of said second surfaces being planar;

said first luminance control film stacked on said second luminance control film such that the prisms of said first surface of said first luminance control film are proximate said second surface of said second luminance control film.

2. The luminance control film assembly of claim 1 wherein theta is greater than 45 degrees and less than 135 degrees.

3. The luminance control film assembly of claim 1 wherein theta is 90 degrees.

4. An optical assembly for providing illumination comprising:

a light source having a reflectivity greater than zero and emitting light;

a luminance control film assembly located proximate said light source;

said luminance control film assembly having a first luminance control film, and having a second luminance control film;

said first luminance control film having a first prism axis and said second luminance control film having a second prism axis;

wherein, said first prism axis and said second prism axis are not parallel, thereby forming a crossing angle theta;

each of said first and second luminance control film having a body portion, each of said body portion having a first surface and having a second surface;

each of said first surfaces having a linear array of prisms characterized by pitch less than 30 micrometers;

each of said second surfaces being planar;

said first luminance control film stacked on said second luminance control film such that the prisms of said first surface of said first luminance control film are proximate said second surface of said second luminance control film;

said second surface of said first luminance control film proximate said light source.

5. An optical assembly for displaying information to a viewer, comprising:

a light source having a reflectivity greater than zero;

a display panel;

a luminance control film assembly located between said light source and said display panel;

said luminance control film assembly including a first luminance control film and a second luminance control film each of said luminance control films having a structured surface and said luminance control films being crossed at an angle theta, where theta is greater than 45 degrees and less than 135 degrees; at least one of said luminance control films having structures of a size such that diffractive effects will cause a soft luminance dropoff as a viewer moves off a central viewing axis.

6. The optical assembly of claim 5 wherein theta is 90 degrees.

* * * * *